(12) United States Patent
Ohyama et al.

(10) Patent No.: US 12,158,779 B2
(45) Date of Patent: Dec. 3, 2024

(54) ELECTRONIC APPARATUS WITH SPINE COMPONENT AND THERMALLY CONDUCTIVE MEMBER

(71) Applicant: Lenovo (Singapore) Pte. Ltd., Singapore (SG)

(72) Inventors: Atsushi Ohyama, Kanagawa (JP); Yusuke Onoue, Kanagawa (JP); Takanori Hoshino, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 94 days.

(21) Appl. No.: 17/943,429

(22) Filed: Sep. 13, 2022

(65) Prior Publication Data

US 2023/0121174 A1    Apr. 20, 2023

(30) Foreign Application Priority Data

Oct. 18, 2021   (JP) .................................. 2021-170283

(51) Int. Cl.
  *G06F 1/16*   (2006.01)
  *G06F 1/20*   (2006.01)
  *G09F 9/30*   (2006.01)

(52) U.S. Cl.
  CPC .......... *G06F 1/1681* (2013.01); *G06F 1/1616* (2013.01); *G06F 1/1652* (2013.01); *G06F 1/203* (2013.01); *G09F 9/301* (2013.01)

(58) Field of Classification Search
  CPC .... G06F 1/1681; G06F 1/1616; G06F 1/1652; G06F 1/203; G06F 1/206; G06F 1/1637; G06F 2200/203; H04M 1/0268; H04M 1/022; H04M 1/0216; G09F 9/301
  See application file for complete search history.

(56) References Cited

U.S. PATENT DOCUMENTS

2019/0317572 A1\* 10/2019 North ...................... G06F 1/203
2023/0422448 A1\* 12/2023 Huh ......................... G06F 1/203

FOREIGN PATENT DOCUMENTS

| JP | H08-042983 A | 2/1996 |
| JP | H08-162576 A | 6/1996 |
| JP | H09-212258 A | 8/1997 |
| JP | H10-254583 A | 9/1998 |
| JP | H11-068367 A | 3/1999 |
| JP | 2000-031679 A | 1/2000 |
| JP | 2008-243201 A | 10/2008 |
| JP | 2009-194178 A | 8/2009 |
| JP | 2021-015522 A | 2/2021 |
| JP | 2021-132155 A | 9/2021 |

\* cited by examiner

*Primary Examiner* — James Wu
*Assistant Examiner* — Dakota M Talbert
(74) *Attorney, Agent, or Firm* — Osha Bergman Watanabe & Burton LLP

(57) ABSTRACT

An electronic apparatus includes: a first chassis equipped with a substrate on which a processing device is mounted; a second chassis which is provided adjacently to the first chassis and equipped with a battery device; a hinge device that connects the first chassis and the second chassis in such a manner as to be rotatable relative to each other between a first posture in which the first chassis and the second chassis are stacked to overlap each other in a surface normal direction and a second posture in which the first chassis and the second chassis are arranged side by side in a direction perpendicular in the surface normal direction; a spine component which is made of a thermally conductive material.

6 Claims, 8 Drawing Sheets

ELECTRONIC APPARATUS WITH SPINE COMPONENT AND THERMALLY CONDUCTIVE MEMBER

CROSS-REFERENCE TO RELATED APPLICATIONS

This application claims priority to Japanese Patent Application No. 2021-170283 filed on Oct. 18, 2021, the contents of which are hereby incorporated herein by reference in their entirety.

TECHNICAL FIELD

The present invention relates to an electronic apparatus having a plurality of chassis connected by a hinge device.

BACKGROUND

In recent years, foldable electronic apparatuses using flexible displays such as organic EL have been proposed (refer to, for example, Japanese Unexamined Patent Application Publication No. 2021-015522).

As an electronic apparatus described above, there is one having a configuration in which one of left and right chassis is equipped with a substrate (motherboard) on which a CPU and the like are mounted, and the other chassis is equipped with a battery device. This configuration is advantageous in that the substrate and the battery device are installed in separate chassis, so that sufficient installation areas for the substrate and the battery device can be secured even in smaller and thinner chassis.

On the other hand, in such a configuration, the amount of heat generated in the chassis incorporating the substrate, on which a processing device such as a CPU has been mounted, becomes significantly larger than the amount of heat generated in the chassis incorporating the battery device, thus leading to a temperature difference between the chassis. However, there are cases where it is difficult to install a cooling device having a high cooling capacity in the chassis of the electronic apparatus as described above due to the influence of the reduced size and thickness. As a result, there is a concern that the performance of the CPU or the like of the electronic apparatus may be deteriorated, or a local high temperature portion (hot spot) may be generated on the outer surface of the chassis incorporating the substrate.

SUMMARY

One or more embodiments of the present invention provide an electronic apparatus capable of adjusting the temperature balance between chassis and improving a cooling capacity.

An electronic apparatus according to a first aspect of one or more embodiments of the present invention includes: a first chassis equipped with a substrate on which a processing device is mounted; a second chassis which is provided adjacently to the first chassis and equipped with a battery device; a hinge device that connects the first chassis and the second chassis in such a manner as to be rotatable relative to each other between a first posture in which the first chassis and the second chassis are stacked to overlap each other in a surface normal direction and a second posture in which the first chassis and the second chassis are arranged side by side in a direction perpendicular in the surface normal direction; a spine component which is made of a thermally conductive material, and which is placed so as to extend along a first edge portion of the first chassis that is adjacent to the second chassis and a second edge portion of the second chassis that is adjacent to the first chassis, cover a gap formed between the first edge portion and the second edge portion in the first posture, and straddle the first edge portion and the second edge portion in the second posture; a first thermally conductive member which is provided on an inner surface of the first chassis and comes in contact with the spine component in the second posture; and a second thermally conductive member which is provided on an inner surface of the second chassis and comes in contact with the spine component in the second posture.

According to the above-described aspect of the present invention, a cooling capacity can be improved by adjusting the temperature balance between chassis.

DETAILED DESCRIPTION

The following will describe in detail one or more embodiments of the electronic apparatus according to the present invention with reference to the accompanying drawings.

Figure 1:
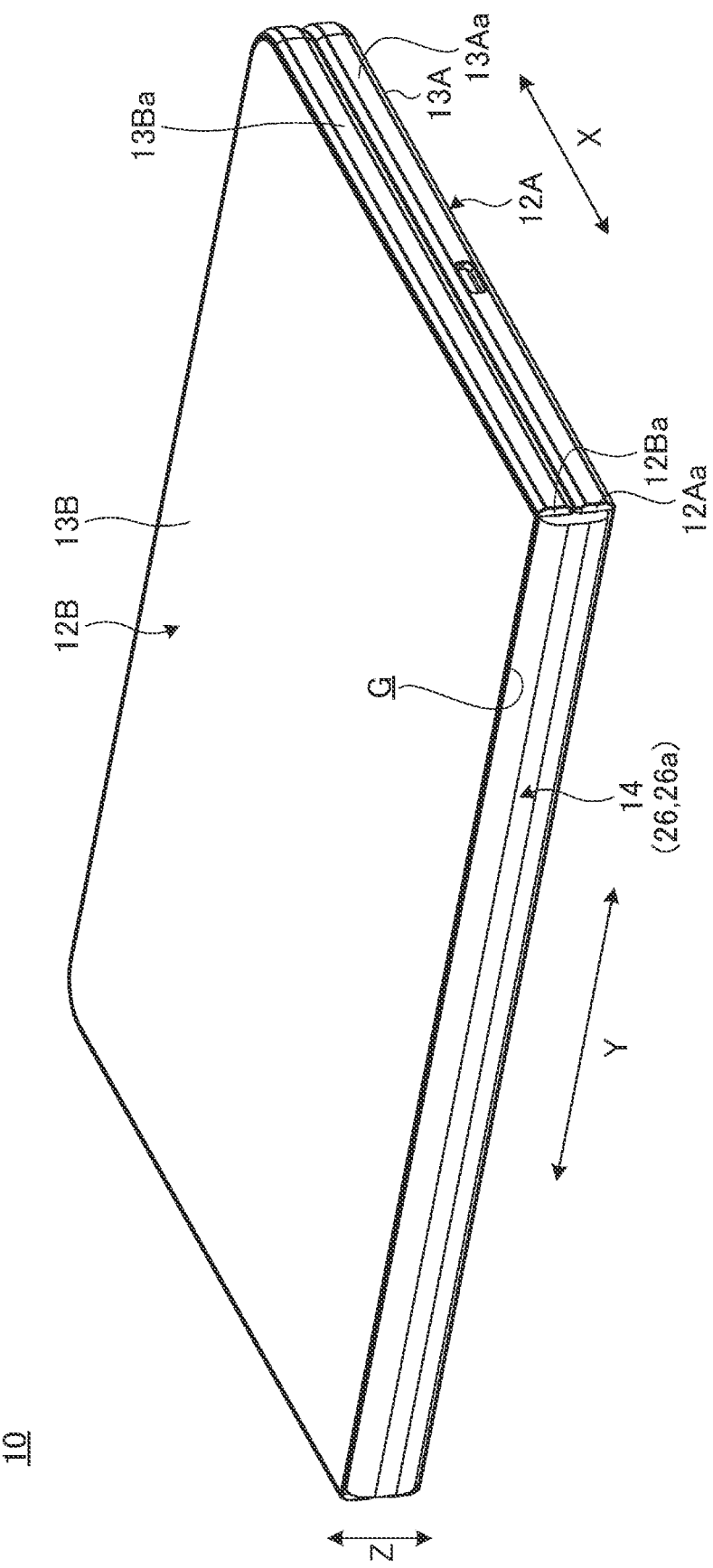
FIG. 1 is a perspective view illustrating an electronic apparatus according to one or more embodiments that has been closed to be in a 0-degree posture.
Figure 2:
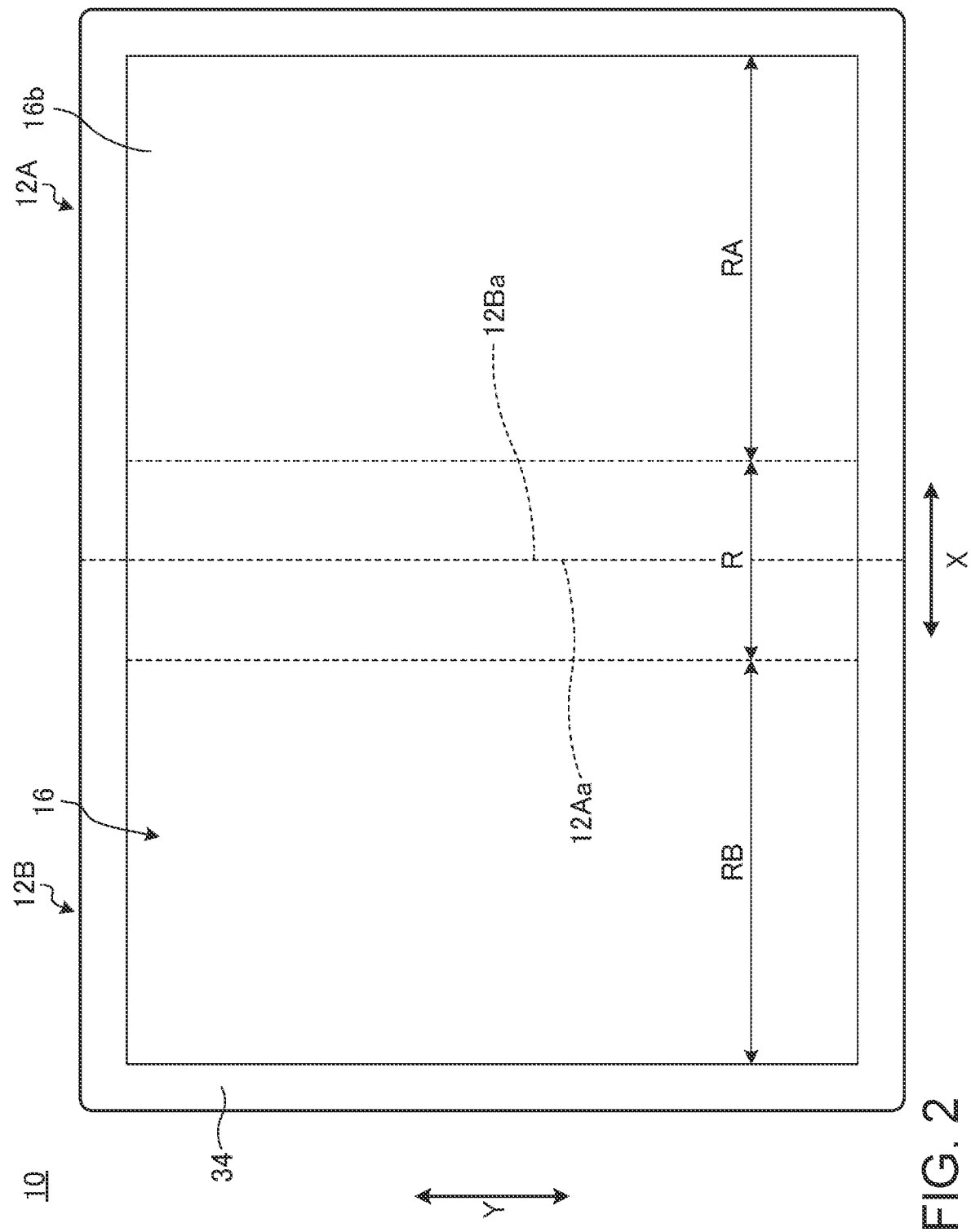
FIG. 2 is a plan view schematically illustrating a state in which the electronic apparatus illustrated in FIG. 1 has been opened to be in a 180-degree posture.
Figure 3:
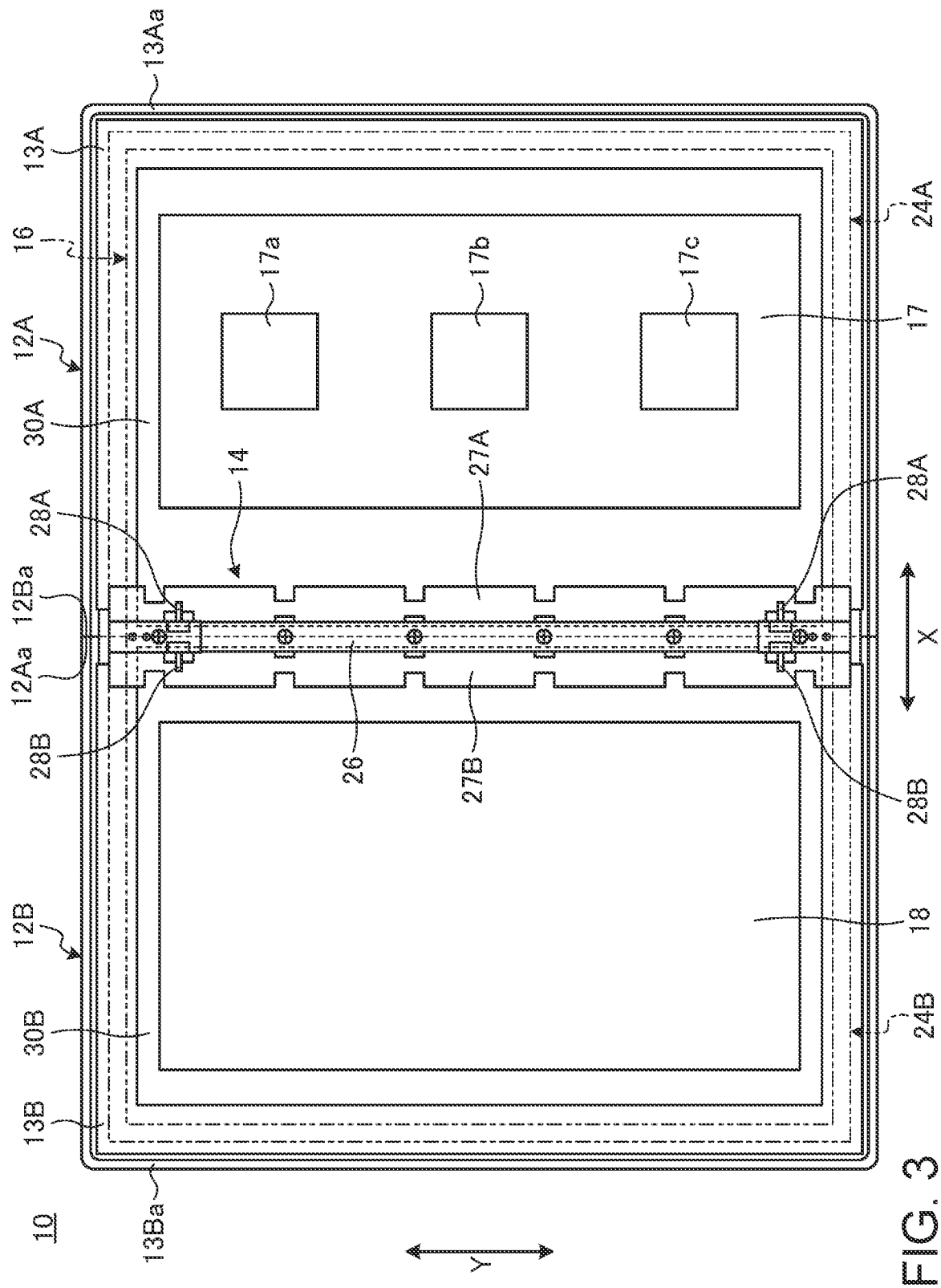
FIG. 3 is a plan view schematically illustrating the internal structure of the electronic apparatus illustrated in FIG. 2.

FIG. 1 is a perspective view illustrating a state in which an electronic apparatus 10 according to one or more embodiments has been closed to be in a 0-degree posture. FIG. 2 is a plan view schematically illustrating a state in which the electronic apparatus 10 illustrated in FIG. 1 has been opened to be in a 180-degree posture. FIG. 3 is a plan view schematically illustrating the internal structure of the electronic apparatus 10 illustrated in FIG. 2.

As illustrated in FIG. 1 to FIG. 3, the electronic apparatus 10 includes a first chassis 12A, a second chassis 12B, a hinge device 14, and a display 16. The present embodiment illustrates the electronic apparatus 10 used as a tablet PC or a laptop PC that can be folded like a book. The electronic apparatus 10 may be a mobile phone, a smartphone, a portable game machine, or the like.

The chassis 12A and 12B are placed adjacently to each other, and edge portions 12Aa and 12Ba, which are adjacent to each other, are connected in a relatively rotatable manner by the hinge device 14. The first chassis 12A is composed of a plate-shaped first bottom cover 13A that forms a back surface and an upright wall 13Aa that forms the side surfaces of three sides other than the first edge portion 12Aa. The second chassis 12B has a plate-shaped second bottom cover 13B that forms the back surface and an upright wall 13Ba that forms the side surfaces of three sides other than the second edge portion 12Ba. Each of the chassis 12A and 12B is made of a metal such as a magnesium alloy, stainless steel or an aluminum alloy, or a resin such as polycarbonate. The chassis 12A and 12B of the present embodiment are made of a magnesium alloy.

As illustrated in FIG. 3, the first chassis 12A has a substrate 17 mounted thereon. The substrate 17 is a motherboard on which electronic components such as a CPU (Central Processing Unit) 17a, a communication module 17b, and an SSD (Solid State Drive) 17c are mounted. The CPU 17a is a processing device that performs the main control of the electronic apparatus 10 and calculations related to processing. The CPU 17a is a largest heat generating element among the electronic components mounted in the electronic apparatus 10. The communication module 17b is, for example, a device that processes information for wireless communication transmitted and received through an antenna mounted on the second chassis 12B, and corresponds to, for example, a wireless WAN or a 5th generation mobile communication system. The SSD 17c is a storage device using a semiconductor memory. Various components other than the substrate 17 are mounted in the first chassis 12A. The communication module 17b and the SSD 17c are heat generating elements having the second largest heat generation amount following the CPU 17a.

The second chassis 12B has a battery device 18 installed therein. The battery device 18 is a secondary battery that serves as the power source of the electronic apparatus 10. Various components other than the battery device 18 are mounted in the second chassis 12B. The battery device 18 is connected to the substrate 17 by a flexible substrate or the like that extends over the edge portions 12Aa and 12Ba. The amount of heat generated by the battery device 18 is smaller than that of the CPU 17a or the like. Therefore, in the electronic apparatus 10, the amount of heat generated in the first chassis 12A is larger than the amount of heat generated in the second chassis 12B.

In the following description, regarding the electronic apparatus 10, the direction in which the chassis 12A and 12B are arranged will be referred to as the X-direction, the direction along the edge portions 12Aa and 12Ba orthogonal to the X-direction will be referred to as the Y-direction, and the thickness direction of the chassis 12A and 12B will be referred to as the Z-direction. Further, regarding the angular posture between the chassis 12A and 12B, the state in which the chassis 12A and 12B are folded so as to overlap each other in the surface normal direction will be referred to as the 0-degree posture (refer to FIG. 1 and FIG. 4C), and a state in which the chassis 12A and 12B are arranged side by side in the direction perpendicular to the surface normal direction (the X-direction) will be referred to as the 180-degree posture (refer to FIG. 2 to FIG. 4A). A posture between 0 degrees and 180 degrees will be referred to with an angle increment as appropriate, and the posture illustrated in FIG. 4B, for example, is referred to as the 90-degree posture. These angles are for convenience of explanation, and it is natural that angular positions in an actual product may deviate slightly from the exact angular positions indicated by angle numbers, and the postures, including the deviated angular positions, will be referred to as the 0-degree posture and the like in the description of the present embodiment.

Figure 4A:
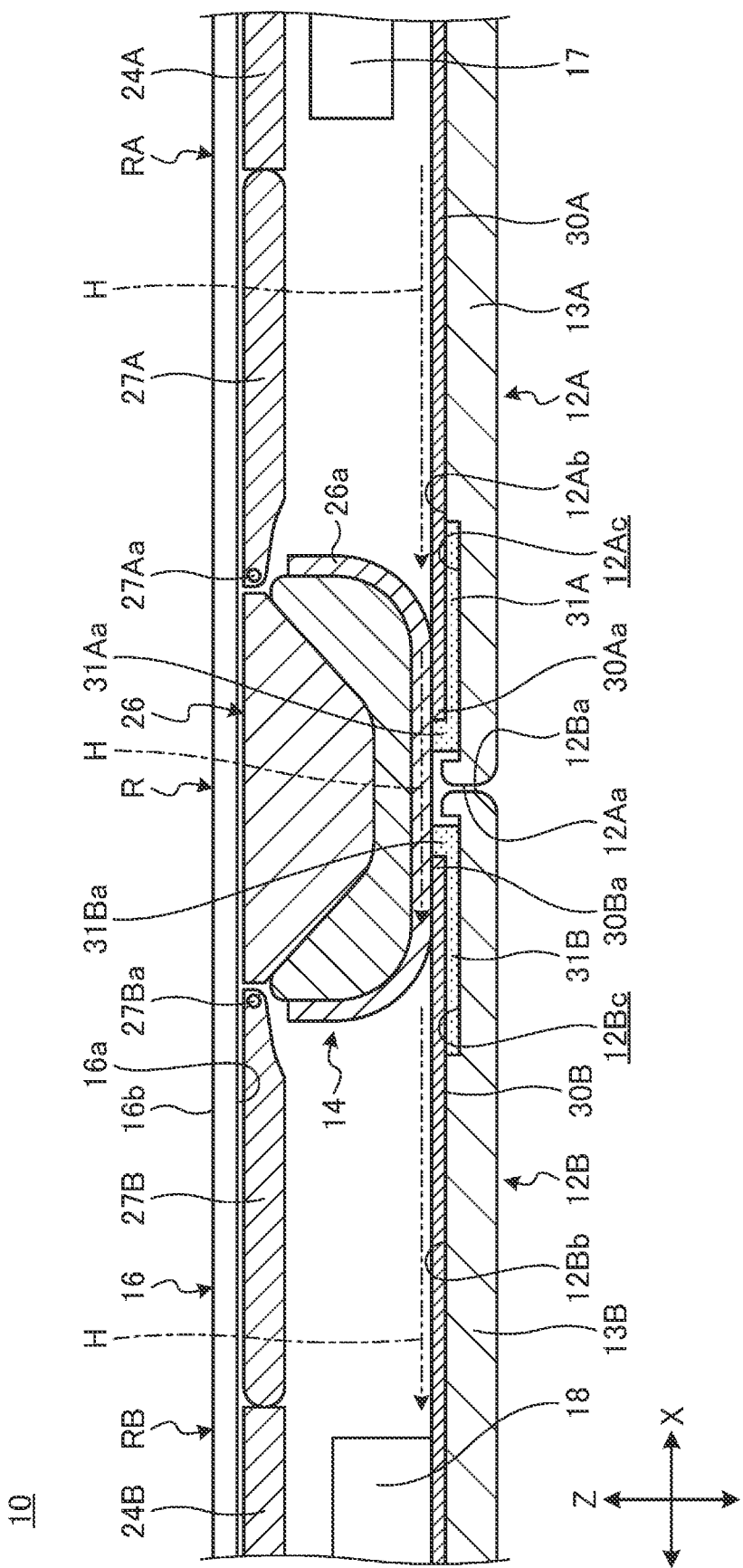
FIG. 4A is a side sectional view schematically illustrating the internal structure of the electronic apparatus in the 180-degree posture.
Figure 4B:
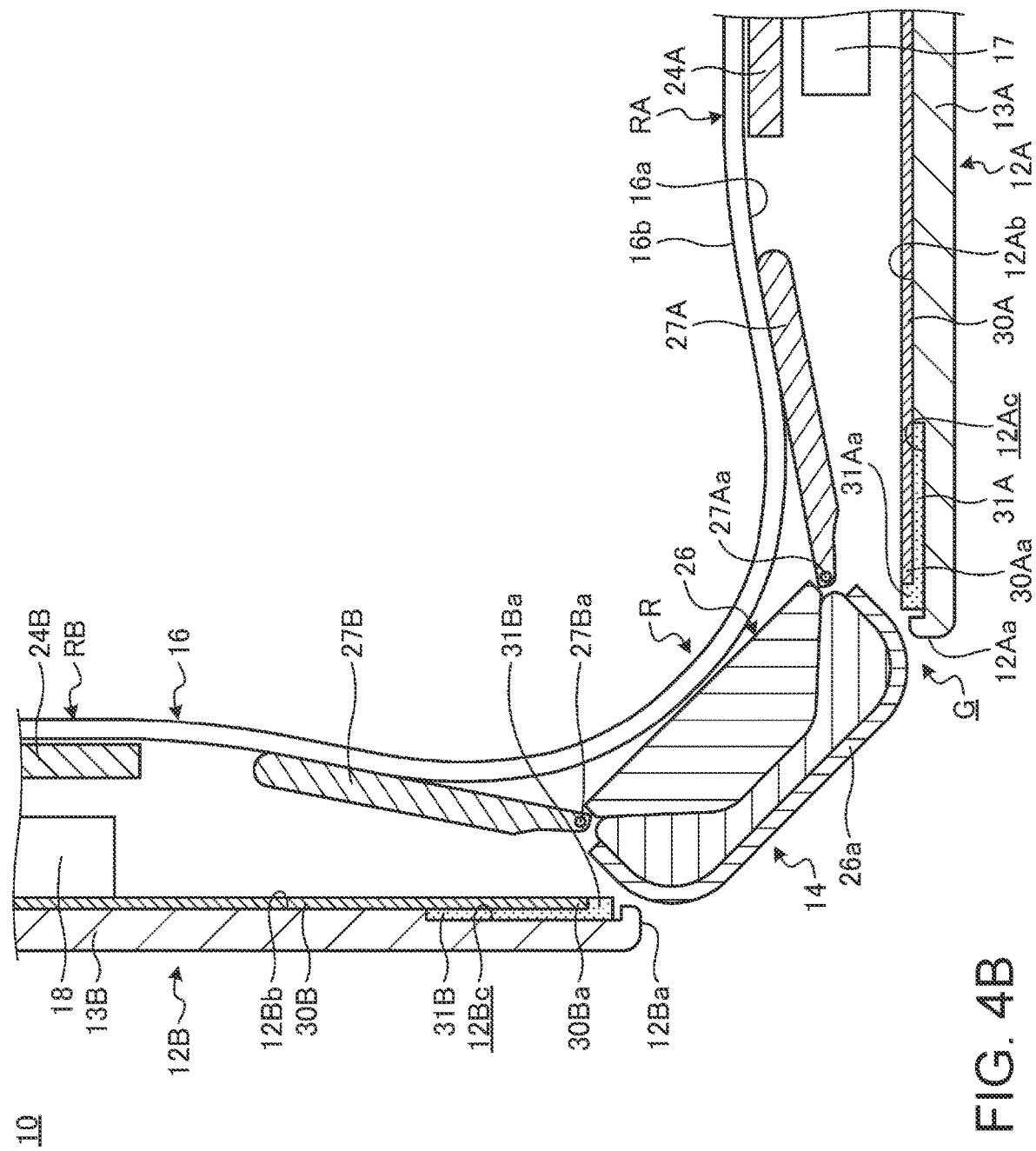
FIG. 4B is a side sectional view illustrating a state in which the chassis are midway in the process of being rotated toward the 0-degree posture from the state illustrated in FIG. 4A.
Figure 4C:
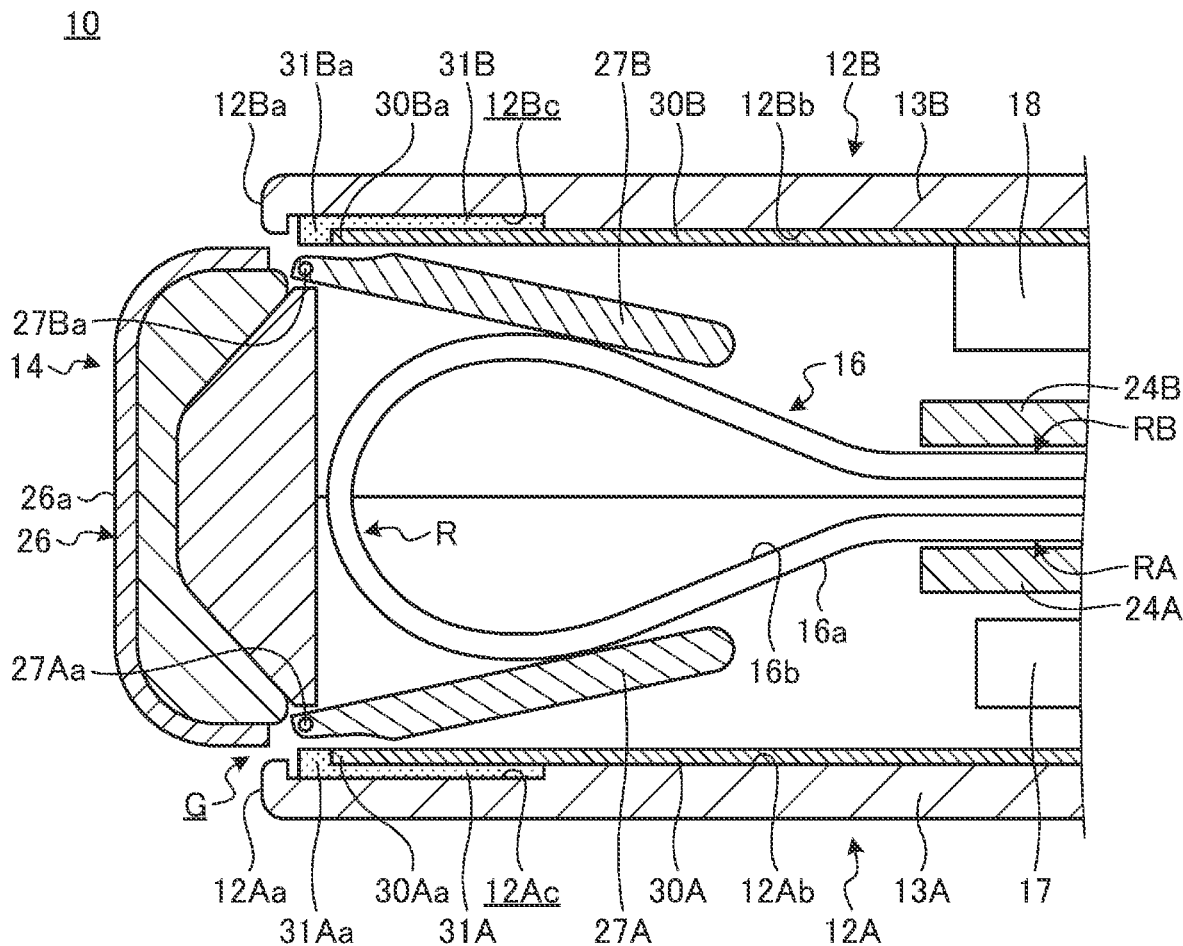
FIG. 4C is a side sectional view illustrating a state in which the electronic apparatus illustrated in FIG. 4A is in the 0-degree posture.

FIG. 4A, FIG. 4B, and FIG. 4C are schematic side sectional views of the electronic apparatus 10 at the 180-degree posture, the 90-degree posture, and the 0-degree posture, respectively.

As illustrated in FIG. 4A to FIG. 4C, the chassis 12A and 12B are connected by the hinge device 14 so as to be rotatable relative to each other between two angular postures (between the 0-degree posture and the 180-degree posture in the present embodiment). In the 0-degree posture illustrated in FIG. 4C, the chassis 12A and 12B are folded to overlap each other in the surface normal direction. In the 180-degree posture illustrated in FIG. 4A, the chassis 12A and 12B are arranged side by side in the direction perpendicular to the surface normal direction (the X-direction).

The display 16 is a flexible display extending over the chassis 12A and 12B. The display 16 extends over the chassis 12A and 12B. In the 0-degree posture illustrated in FIG. 4C, the display 16 is placed such that a region RA on the first chassis 12A side and a region RB on the second chassis 12B side face each other, and a fold region R, which is a boundary region between the regions RA and RB, is in a state of being bent in an arc shape. In the 180-degree posture illustrated in FIG. 4A, the regions RA, R, and RB are arranged side by side on an XY plane, and the display 16 forms a single flat plate shape as a whole (refer also to FIG. 2).

In the display 16, a rear surface 16a is supported by the chassis 12A and 12B and the hinge device 14, and a front surface 16b serves as an image display surface. The display 16 is located at the topmost level of the chassis 12A and 12B in the Z-direction. The display 16 has a paper-like structure composed of, for example, an organic EL or the like.

In the display 16, the region RA is relatively fixed to the first chassis 12A, and the region RB is relatively fixed to the second chassis 12B. Specifically, the rear surface 16a of the region RA is supported by a first plate 24A and a first support plate 27A, and is fixed to the first chassis 12A through the first plate 24A. The rear surface 16a of the region RB is supported by a second plate 24B and a second support plate 27B, and is fixed to the second chassis 12B through the second plate 24B. The support plates 27A and 27B are components of the hinge device 14.

The fold region R is movable relative to the chassis 12A and 12B. In the 180-degree posture, the rear surface 16a of the fold region R is supported by a hinge main body 26 and the support plates 27A and 27B (refer to FIG. 4A). In the 0-degree posture, the fold region R is bent in the arc shape, and a part of the rear surface 16a is supported by the support plates 27A and 27B, and the majority thereof separates from the hinge device 14 (refer to FIG. 4C).

The plates 24A and 24B are plates formed of a carbon fiber reinforced resin or a metal. The plates 24A and 24B are arranged on left and right so as to sandwich the hinge device 14 therebetween, and support the rear surface 16a of the display 16 by the front surfaces thereof.

As illustrated in FIG. 3 to FIG. 4C, the hinge device 14 of the present embodiment has the hinge main body 26, the first support plate 27A, and the second support plate 27B. The hinge device 14 may have a different configuration insofar as the hinge device 14 connects the chassis 12A and 12B in the relatively rotatable manner, and enables the display 16 to be folded to a desired folded shape.

The hinge main body 26 is provided at a position where the hinge main body 26 extends over the edge portions 12Aa and 12Ba of the chassis 12A and 12B, respectively (refer to FIG. 4A), and extends over substantially the full length in the Y-direction along the edge portions 12Aa and 12Ba (refer to FIG. 1 and FIG. 3). The hinge main body 26 is a block-shaped component formed of an aluminum alloy or the like. The hinge main body 26 is connected to a bracket, which is fixed to the first chassis 12A, in a relatively movable manner through a first rotating link 28A (refer to FIG. 3). Further, the hinge main body 26 is connected to a bracket, which is fixed to the second chassis 12B, in a relatively movable manner through a second rotating link 28B (refer to FIG. 3). Thus, the hinge main body 26 connects the chassis 12A and 12B in the relatively rotatable manner. A gear mechanism, which synchronizes the rotational movements of the chassis 12A and 12B, a torque mechanism, which imparts predetermined rotational torque to the rotational movements of the chassis 12A and 12B, and the like are also provided in the hinge main body 26.

The outer surface of the hinge main body 26 is covered by a spine component 26a. The spine component 26a of the present embodiment is a substantially U-shaped plate matched to the shape of the outer surface of the hinge main body 26. The spine component 26a is formed of a thermally conductive material such as an aluminum alloy or stainless steel. The spine component 26a is a decorative cover with enhanced outer surface quality.

In the 180-degree posture illustrated in FIG. 4A, the hinge main body 26 is housed in the chassis 12A and 12B, and extends over, in the X-direction, the edge portions 12Aa and 12Ba which are closer to each other. In the 0-degree posture illustrated in FIG. 4C, the hinge main body 26 is placed to close a gap G formed between the edge portions 12Aa and 12Ba that are significantly spaced away from each other. At this time, the spine component 26a is placed at the outermost surface thereby to prevent the degradation of the appearance design of the electronic apparatus 10 that has been folded (refer to FIG. 1).

In other words, the spine component 26a covers the gap G formed between the chassis 12A and 12B in the angular postures other than the 180 degrees (e.g., the 0-degree posture or the 90-degree posture) (refer to FIG. 1, FIG. 4B and FIG. 4C). Thus, the spine component 26a prevents the components inside the chassis 12A and 12B from being exposed to the outside through the gap G. The spine component 26a is placed so as to straddle in the X-direction the edge portions 12Aa and 12Ba that are closer to each other and to be housed in the chassis 12A and 12B in the 180-degree posture (refer to FIG. 4A).

For example, if the hinge device 14 is composed of one or a plurality of small piece components or the like rather than the configuration extending in the Y-direction as illustrated in FIG. 3, then the spine component 26a may be supported by the chassis 12A and 12B separately from the hinge device 14. More specifically, the spine component 26a does not have to be necessarily a component of the hinge device 14, and in short, the configuration and the mounting form thereof are not limited insofar as the spine component 26a can cover the gap G in the angular postures other than 180 degrees. However, in the present embodiment, the fact that the spine component 26a is a component of the hinge device 14 eliminates the need for a separate configuration or mechanism for installing the spine component 26a to the chassis 12A and 12B, thus simplifying the configuration.

The support plates 27A and 27B are plates which are formed of an aluminum alloy or the like and have shapes that are symmetrical to each other. The first support plate 27A is provided on an inner surface 12Ab side of the first chassis 12A, more specifically, above the inner surface of the first bottom cover 13A, and extends over substantially the full length in the Y-direction along the edge portion 12Aa. One end in the width direction (the X-direction) of the first support plate 27A is connected to the hinge main body 26 in the relatively rotatable manner by using a rotating shaft 27Aa. The first support plate 27A is provided such that the other end thereof in the width direction is relatively movable with respect to the first chassis 12A and is adjacent to one end of the first plate 24A. Thus, the first support plate 27A is placed between the hinge main body 26 and the first plate 24A in the 180-degree posture.

The second support plate 27B is provided on an inner surface 12Bb side of the second chassis 12B (above the inner surface of the second bottom cover 13B), and extends over substantially the full length in the Y-direction along the edge portion 12Ba. One end of the second support plate 27B is connected to the hinge main body 26 in the relatively rotatable manner by using a rotating shaft 27Ba, and the other end is adjacent to one end of the second plate 24B. Thus, the second support plate 27B is placed between the hinge main body 26 and the second plate 24B in the 180-degree posture.

The support plates 27A and 27B move in the X-direction and the Z-direction relative to the inner surfaces 12Ab and 12Bb of the chassis 12A and 12B, respectively, in response to the rotational movements of the chassis 12A and 12B. In the 180-degree posture, the support plates 27A and 27B support, by the front surfaces thereof, the rear surface 16a of the display 16. In an angular posture other than 180-degree posture, the support plates 27A and 27B come in contact with the display 16 in a state in which a gap is provided between the support plates 27A and 27B and the display 16, or with a small force that does not deform the display 16. The support plates 27A and 27B may be configured to support the fold region R of the display 16 and to correct the shape thereof also in an angular posture other than the 180-degree posture. As described above, the support plates 27A and 27B stably support the fold region R of the display 16 on a flat surface in the 180-degree posture, but do not hinder the bending movement of the fold region R.

As illustrated in FIG. 3 to FIG. 4C, the electronic apparatus 10 includes a first thermally conductive member 30A and a first cushion member 31A provided in the first chassis 12A and a second thermally conductive member 30B and a second cushion member 31B provided in the second chassis 12B.

The thermally conductive members 30A and 30B are sheet-like members formed of a thermally conductive material such as a graphite sheet, a copper sheet, or an aluminum sheet. The thermally conductive members 30A and 30B of the present embodiment are graphite sheets. A graphite sheet is made by processing graphite (black lead), which is an allotrope of carbon, into a sheet form, and has high thermal conductivity. The thermally conductive members 30A and 30B are thin and flexible sheets having a thickness of, for example, approximately 10 μm to 1 mm. Even when a copper sheet or an aluminum sheet is used in place of the graphite sheet, the thermally conductive members 30A and 30B are to be formed of a thin metal foil of approximately 10 μm to 1 mm as in the case of the graphite sheet, and have flexibility.

The first thermally conductive member 30A is a heat transport member which transports the heat in the first chassis 12A and the heat of the first bottom cover 13A to the spine component 26a. The second thermally conductive member 30B is a heat diffusion member that receives the heat transported from the first thermally conductive member 30A to the spine component 26a and dissipates the heat to the inside of the second chassis 12B and the second bottom cover 13B.

As illustrated in FIG. 4A, the first thermally conductive member 30A is attached to the inner surface 12Ab of the first bottom cover 13A. The first thermally conductive member 30A is located at a position where an edge portion 30Aa on the first edge portion 12Aa side overlaps the spine component 26a in the Z-direction. The first thermally conductive member 30A comes in contact with the spine component 26a in the 180-degree posture illustrated in FIG. 4A. At this time, the first thermally conductive member 30A comes in contact with the spine component 26a by a large surface area thereof, because the first thermally conductive member 30A extends over substantially the full length of the spine component 26a in the Y-direction (refer to FIG. 3).

The first thermally conductive member 30A of the present embodiment is provided so as to extend over substantially the whole surface of the inner surface 12Ab (refer to FIG. 3). The first thermally conductive member 30A can be of any size (surface area) insofar as at least the edge portion 30Aa is at a position where the edge portion 30Aa overlaps the spine component 26a. However, in order to absorb and transport the heat in the first chassis 12A more efficiently, the first thermally conductive member 30A preferably has a portion, other than at least the edge portion 30Aa, that overlaps the CPU 17a, which is the largest heat generating element, in the Z-direction.

As illustrated in FIG. 4A, the second thermally conductive member 30B is attached to the inner surface 12Bb of the second bottom cover 13B. The second thermally conductive member 30B is located at a position where an edge portion 30Ba on the second edge portion 12Ba side overlaps the spine component 26a in the Z-direction. The second thermally conductive member 30B also comes in contact with the spine component 26a in the 180-degree posture illustrated in FIG. 4A.

The second thermally conductive member 30B of the present embodiment is shaped to be symmetrical to the first thermally conductive member 30A (refer to FIG. 3 and FIG. 4A). In other words, the second thermally conductive member 30B may have the same installation position and the size as those of the first thermally conductive member 30A described above. However, the second thermally conductive member 30B should be capable of transferring the heat received from the spine component 26a to at least the second bottom cover 13B. For this reason, the second thermally conductive member 30B may have an area that is smaller than that of the first thermally conductive member 30A insofar as at least the edge portion 30Ba can come in contact with the spine component 26a.

Next, the cushion members 31A and 31B are formed of a material having flexibility and a certain degree of repulsive force, such as rubber or sponge. The cushion members 31A and 31B of the present embodiment are made of a foam material (sponge).

The first cushion member 31A is provided between the first thermally conductive member 30A and the inner surface 12Ab of the first chassis 12A, and presses the first thermally conductive member 30A against the spine component 26a in the 180-degree posture. Similarly, the second cushion member 31B is provided between the second thermally conductive member 30B and the inner surface 12Bb of the second chassis 12B, and presses the second thermally conductive member 30B against the spine component 26a in the 180-degree posture. Thus, the cushion members 31A and 31B are provided at the positions where the cushion members 31A and 31B overlap, in the Z-direction, at least the edge portions 30Aa and 30Ba of the thermally conductive members 30A and 30B, respectively, and the spine component 26a, and extend in the Y-direction along the edge portions 30Aa and 30Ba, respectively.

If, for example, the cushion members 31A and 31B cover the entire surfaces of the thermally conductive members 30A and 30B, then the heat transfer between the thermally conductive members 30A and 30B and the hot air in the chassis 12A and 12B will be hindered. Therefore, in the present embodiment, the installation of the cushion members 31A and 31B is limited only to the edge portions 30Aa and 30Ba and the vicinity thereof in the X-direction (refer to FIG. 4A).

As illustrated in FIG. 4A, the chassis 12A and 12B have recessed portions 12Ac and 12Bc, which are a step lower than the inner surfaces 12Ab and 12Bb of portions close to the edge portions 12Aa and 12Ba. The recessed portions 12Ac and 12Bc extend in the Y-direction. The cushion members 31A and 31B are placed in the recessed portions 12Ac and 12Bc, respectively. This prevents the edge portions 30Aa and 30Bb of the thermally conductive members 30A and 30B from bulging out upward from the rest by the thicknesses of the cushion members 31A and 31B.

The cushion members 31A and 31B of the present embodiment are configured to have a substantially L-shape in the side view given in FIG. 4A, and have protective portions 31Aa and 31Ba, which cover the end surfaces of the edge portions 30Aa and 30Ba of the thermally conductive members 30A and 30B. The thermally conductive members 30A and 30B composed of a graphite sheet are brittle and prone to powder spillage and breakage. In particular, the end surface corners of the edge portions 30Aa and 30Ba are repeatedly abutted against the spine component 26a and are therefore likely to incur damage or the like. For this reason, the cushion members 31A and 31B have the protective portions 31Aa and 31Ba to protect the end surfaces, thereby suppressing damage or the like to the thermally conductive members 30A and 30B over time. The entire front surfaces of the thermally conductive members 30A and 30B, which are graphite sheets, are covered and protected by, for example, a Mylar film (a film made of polyethylene terephthalate).

A description will now be given of the rotational movement and the operation and effect of the chassis 12A and 12B.

First, in the 180-degree posture illustrated in FIG. 4A, the plates 24A and 24B, the hinge main body 26, and the support plates 27A and 27B are arranged on the same XY plane with the front surfaces thereof being flush, thus forming a flat plate as a whole. The display 16 has the entire rear surface 16a supported on the flat plate, forming a single plate-shaped large screen (refer also to FIG. 2). Reference numeral 34 in FIG. 2 denotes a bezel member, which is a member that covers, like a frame, a nonactive region located in the peripheral edge portion of the front surface 16b of the display 16.

As described above, the electronic apparatus 10 functions as a tablet PC with a large screen in the 180-degree posture. At this time, the CPU 17a generates a large amount of heat depending on the state of use of the electronic apparatus 10 (e.g., video streaming playback). This leads to a concern that the CPU 17a itself may deteriorate the capacity thereof or a hot spot may be generated on the back surface (outer surface) of the first chassis 12A.

Therefore, the electronic apparatus 10 includes the thermally conductive members 30A and 30B and the spine component 26a made of a thermally conductive material. Consequently, the heat in the first chassis 12A (e.g., the heat generated by the CPU 17a) is transferred directly to or indirectly through the first bottom cover 13A to the first thermally conductive member 30A. Arrows H indicated by the chain lines in FIG. 4A schematically illustrate the movement of heat.

The heat of the CPU 17a or the like transferred to the first thermally conductive member 30A is transmitted in the first thermally conductive member 30A and then transferred from a portion of contact between the first thermally conductive member 30A and the spine component 26a to the spine component 26a, and moves in the spine component 26a. Then, the heat that has moved in the spine component 26a is transferred from a portion of contact between the spine component 26a and the second thermally conductive member 30B to the second thermally conductive member 30B. Thus, a part of the heat from the first chassis 12A transferred to the second thermally conductive member 30B is diffused by the second thermally conductive member 30B and another part is transferred to the second bottom cover 13B and then dissipated to the outside of the second chassis 12B. The heat in the first chassis 12A that has not been transferred to the first thermally conductive member 30A is of course also dissipated to the outside of the first chassis 12A through the first bottom cover 13A and the like.

As described above, the electronic apparatus 10 of the present embodiment includes the thermally conductive members 30A and 30B and the spine component 26a made of a thermally conductive material, thus enabling highly efficient heat dissipation using the second chassis 12B, which generates less heat than the first chassis 12A. Consequently, the electronic apparatus 10 maintains the temperature balance between the right and left chassis 12A and 12B, thereby promoting the cooling of the CPU 17a and the like and also suppressing the generation of a hot spot and the like. In other words, in the electronic apparatus 10, the whole chassis 12A and 12B function as a thermal storage and a heat spreader due to the thermally conductive members 30A and 30B and the spine component 26a, so that a sufficient cooling capacity is obtained without installing separate high-performance cooling devices in the chassis 12A and 12B. Further, the electronic apparatus 10 can move heat in the chassis 12A and 12B, thus eliminating the time and effort to, for example, provide a leather cover or the like that covers the outer surfaces (the back surfaces) of the chassis 12A and 12B and to provide the leather cover or the like with a thermally conductive member.

Further, in the electronic apparatus 10, the thermally conductive members 30A and 30B and the spine component 26a all extend over substantially the full lengths of the chassis 12A and 12B in the Y-direction. Consequently, the area of contact between the thermally conductive members 30A and 30B and the spine component 26a increases, thus securing the amount of mutual heat transfer.

In addition, the electronic apparatus 10 has the cushion members 31A and 31B, which press the thermally conductive members 30A and 30B against the spine component 26a in the 180-degree posture. As a result, in the electronic apparatus 10, the thermally conductive members 30A and 30B and the spine component 26a securely come in close contact, thereby improving the efficiency of mutual heat transfer.

A description will now be given of a case where the chassis 12A and 12B are rotated from the 180-degree posture toward the 0-degree posture. In this case, as the chassis 12A and 12B perform an opening movement, the support plates 27A and 27B move relative to the chassis 12A and 12B (refer to FIG. 4A to FIG. 4C) while swinging about the rotating shafts 27Aa and 27Ba. The chassis 12A and 12B relatively move in the direction for moving away from the support plates 27A and 27B, respectively, in the X-direction. At this time, the plates 24A and 24B move integrally with the chassis 12A and 12B. Consequently, the fold region R of the display 16 fixed to the plates 24A and 24B is gradually opened.

In the 0-degree posture illustrated in FIG. 4C, the chassis 12A and 12B are in a folded state in which the chassis 12A and 12B are stacked with the surface normal directions thereof substantially in parallel to each other, providing excellent aesthetic appearance. At this time, the display 16 has a bell shape in which the fold region R is curved with a desired curvature. In other words, the fold region R of the display 16 is bent into a desired bell shape by the plates 24A and 24B stacked in parallel through a predetermined gap. As a result, in the electronic apparatus 10, the chassis 12A and 12B are made as thin as possible, and damage to the display 16 at the time of bending is suppressed. When the chassis 12A and 12B are rotated from the 180-degree posture to the 0-degree posture, the thermally conductive members 30A and 30B move away from the spine component 26a as illustrated in FIG. 4B and FIG. 4C.

Next, when the chassis 12A and 12B are rotated from the 0-degree posture toward the 180-degree posture, the movements are reversed from the above. Then, when the chassis 12A and 12B finally reach the 180-degree posture, the thermally conductive members 30A and 30B come in contact with the spine component 26a again. At this time, the rear sides of the thermally conductive members 30A and 30B are supported by the cushion members 31A and 31B, so that the thermally conductive members 30A and 30B securely come in close contact with the spine component 26a. As a result, the electronic apparatus 10 is placed in a contact state in which the thermally conductive members 30A and 30B and the spine component 26a are in close contact with each other, and the cooling effect by heat transport between the chassis 12A and 12B described above is obtained.

Further, the thermally conductive members 30A and 30B are thin graphite sheets or copper sheets, and are both flexible. Therefore, even when the chassis 12A and 12B are repeatedly rotated, the generation of impact noise and damage to the spine component 26a due to contact of the thermally conductive members 30A and 30B with the spine component 26a are suppressed.

The cushion members 31A and 31B may be omitted. In this case, however, the bottom covers 13A and 13B made of a metal and the spine component 26a made of a metal come in contact with each other with only the thin graphite sheets (the thermally conductive members 30A and 30B) sandwiched therebetween. Therefore, the electronic apparatus 10 desirably uses the cushion members 31A and 31B from the viewpoints of mainly the property of close contact between the thermally conductive members 30A and 30B and the spine component 26a and the impact noise at the time of contact.

Figure 5:
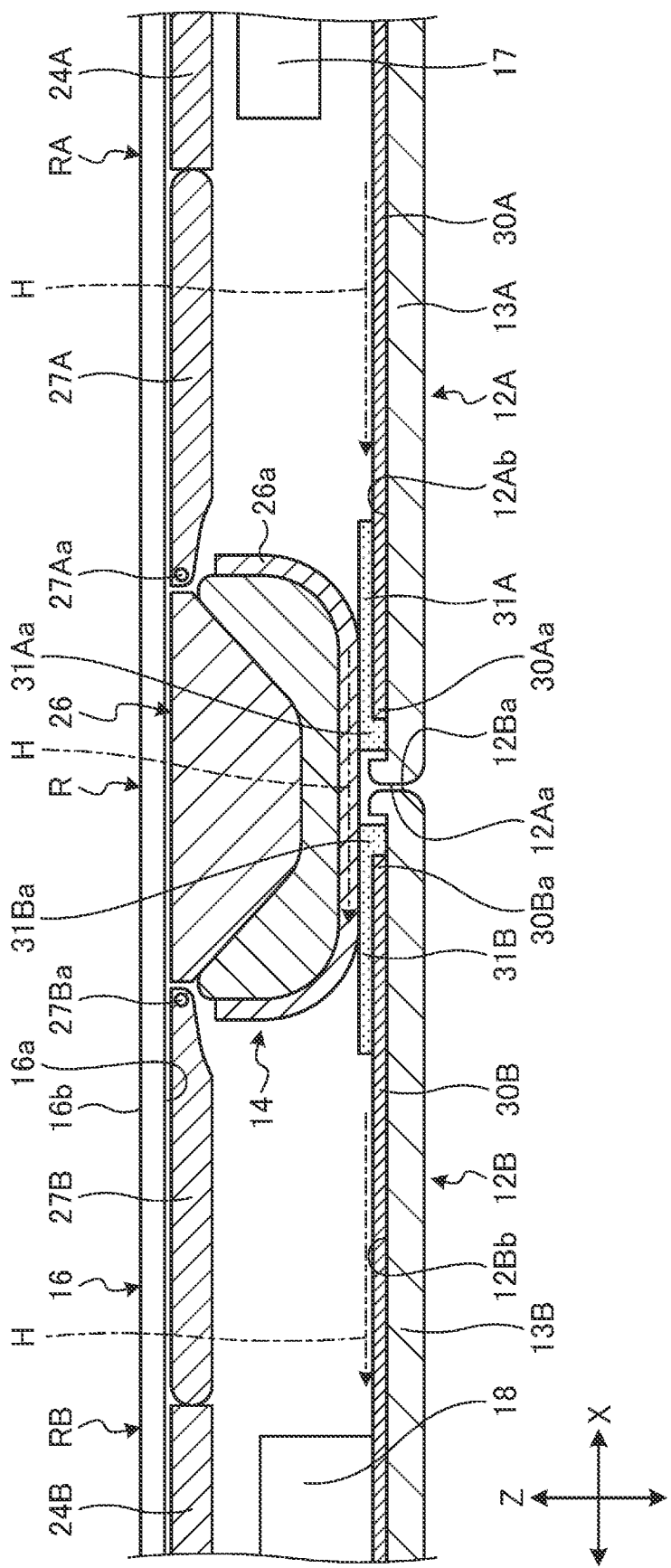
FIG. 5 is a side sectional view schematically illustrating the internal structure of an electronic apparatus according to a first modified example of one or more embodiments in the state of the 180-degree posture.

FIG. 5 is a side sectional view schematically illustrating the internal structure of an electronic apparatus 40 according to a first modified example set in the 180-degree posture.

The electronic apparatus 40 illustrated in FIG. 5 differs from the electronic apparatus 10 illustrated in FIG. 4A in the shape and placement of thermally conductive members 30A and 30B and cushion members 31A and 31B. In the electronic apparatus 40, the entire surfaces of the thermally conductive members 30A and 30B including edge portions 30Aa and 30Ba are attached to inner surfaces 12Ab and 12Bb of chassis 12A and 12B. The cushion members 31A and 31B are placed upside down from those illustrated in FIG. 4A. Consequently, the cushion members 31A and 31B cover the surfaces of the edge portions 30Aa and 30Ba of the thermally conductive members 30A and 30B and peripheral portions thereof.

In the electronic apparatus 40, the cushion members 31A and 31B are placed between a spine component 26a and the thermally conductive members 30A and 30B, and the cushion members 31A and 31B come in contact with the spine component 26a. For this reason, the cushion members 31A and 31B need to be capable of efficiently transferring the heat of the thermally conductive members 30A and 30B to the spine component 26a. The cushion members 31A and 31B need to be formed of, for example, a rubber material having high thermal conductivity, that is, a thermally conductive material such as so-called thermal rubber. In other words, the electronic apparatus 40 uses the cushion members 31A and 31B as the thermally conductive members that complement the thermally conductive members 30A and 30B that perform heat transfer with the spine component 26a.

As described above, in the electronic apparatus 40, the thermally conductive members 30A and 30B composed of graphite sheets or the like do not come in direct contact with the spine component 26a made of a metal. Consequently, the electronic apparatus 40 is advantageous in that the generation of damage to the thermally conductive members 30A and 30B can be suppressed more securely even when the chassis 12A and 12B are repeatedly rotated.

Figure 6:
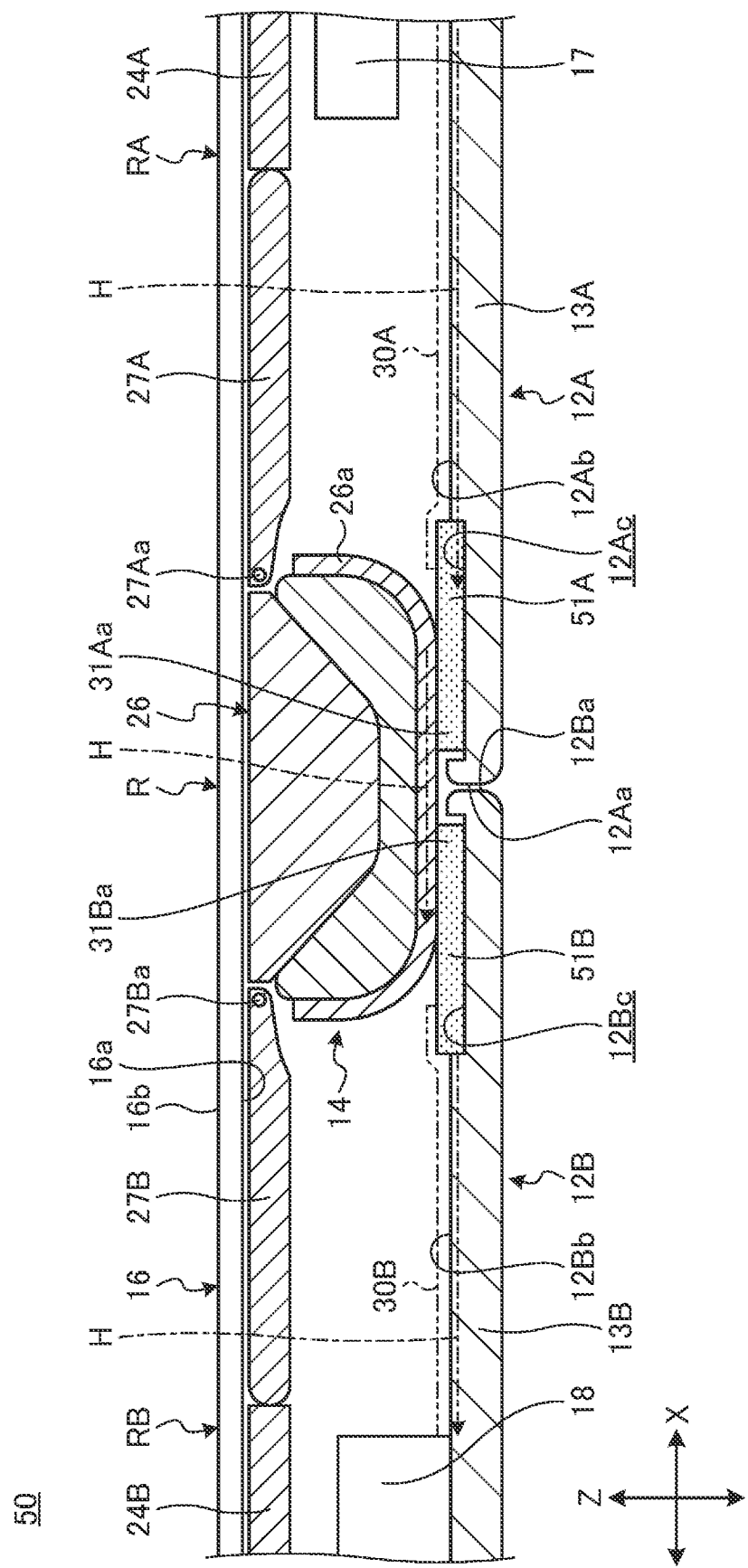
FIG. 6 is a side sectional view schematically illustrating the internal structure of an electronic apparatus according to a second modified example of one or more embodiments in the state of the 180-degree posture.

FIG. 6 is a side sectional view schematically illustrating the internal structure of an electronic apparatus 50 according to a second modified example in the 180-degree posture.

The electronic apparatus 50 illustrated in FIG. 6 differs from the electronic apparatus 10 illustrated in FIG. 4A in that the thermally conductive members 30A and 30B are omitted, and cushion members 51A and 51B are provided in place of the cushion members 31A and 31B. The first cushion member 51A is placed in a recessed portion 12Ac and interposed between an inner surface 12Ab of a first chassis 12A and a spine component 26a. Similarly, the second cushion member 51B is placed in a recessed portion 12Bc and interposed between an inner surface 12Bb of a second chassis 12B and the spine component 26a.

In the electronic apparatus 50, the heat in the first chassis 12A is transferred to the first cushion member 51A through a first bottom cover 13A, and then transferred from the first cushion member 51A to the spine component 26a. The heat transferred to the spine component 26a is transferred to a second bottom cover 13B through the second cushion member 51B, and then diffused and dissipated. This means that, in the electronic apparatus 50 also, the cushion members 51A and 51B come in contact with the spine component 26a, so that the cushion members 51A and 51B need to be formed of a thermally conductive material such as thermal rubber. In other words, the electronic apparatus 50 uses the cushion members 51A and 51B as the thermally conductive members that replace the thermally conductive members 30A and 30B, which perform heat transfer with the spine component 26a. As a result, the electronic apparatus 50 can omit the thermally conductive members 30A and 30B composed of graphite sheets or the like, thus leading to a reduction in cost of components.

In the electronic apparatus 50 also, as indicated by the two-dot chain lines in FIG. 6, the thermally conductive members 30A and 30B of graphite sheets or the like may be attached to cover the area from the inner surfaces 12Ab and 12Bb of the chassis 12A and 12B to a part of the cushion members 51A and 51B. This is because the thermal conductivity efficiency of the bottom covers 13A and 13B made of, for example, a magnesium alloy is significantly lower than that of the thermally conductive members 30A and 30B, which are graphite sheets, and the efficiency of heat movement through the spine component 26a is improved by using the thermally conductive members 30A and 30B. Especially when the chassis 12A and 12B (the bottom covers 13A and 13B) are composed of a material having low thermal conductivity such as a resin, the thermally conductive members 30A and 30B are important for heat transport in any of the electronic apparatuses 10, 40, and 50 in each configuration example.

The present invention is not limited to the embodiments described above, and can be of course freely modified within a scope that does not deviate from the gist of the present invention.

The electronic apparatuses 10, 40 and 50 may be provided with separate cooling devices for cooling the CPU 17a. Examples of the cooling device include heat spreaders such as copper plates and aluminum plates and vapor chambers, and further, cooling fins and blower fans connected thereto.

The above has illustrated the electronic apparatuses 10, 40, and 50, which can be folded in half like a book, but the present invention can be applied to, other than the configuration in which chassis of the same shape are folded in half, various configurations, e.g., a double-door configuration in which small chassis are foldably connected to the left and right edge portions of a large chassis, an S-shaped folding configuration in which chassis with different folding directions are connected to the left and right edge portions of a single chassis, and a J-shaped folding configuration in which a small chassis is foldably connected to one of the left and right edge portions of a large chassis, and the number of chassis connected may be four or more.

DESCRIPTION OF SYMBOLS 10, 40, 50 electronic apparatus
12A first chassis
12B second chassis
13A first bottom cover
13B second bottom cover
14 hinge device
16 display
17 substrate
17a CPU
18 battery device
26 hinge main body
26a spine component
30A first thermally conductive member
30B second thermally conductive member
31A, 51A first cushion member
31B, 51B second cushion member

What is claimed is:
1. An electronic apparatus comprising:
a first chassis equipped with a first bottom cover and a substrate on which a processing device is mounted;
a second chassis which is provided adjacently to the first chassis and equipped with a second bottom cover and a battery device;

a hinge device that connects the first chassis and the second chassis in such a manner as to be rotatable relative to each other between a first posture in which the first chassis and the second chassis are stacked to overlap each other in a surface normal direction and a second posture in which the first chassis and the second chassis are arranged side by side in a direction perpendicular in the surface normal direction;

a spine component which is made of a thermally conductive material, and which is placed so as to extend along a first edge portion of the first chassis that is adjacent to the second chassis and a second edge portion of the second chassis that is adjacent to the first chassis, cover a gap formed between the first edge portion and the second edge portion in the first posture, and straddle the first edge portion and the second edge portion in the second posture;

a first thermally conductive member which is provided on an inner surface of the first bottom cover of the first chassis and comes in contact with the spine component in the second posture; and a second thermally conductive member which is provided on an inner surface of the second bottom cover of the second chassis and comes in contact with the spine component in the second posture;

a first cushion member that
  directly connects the first thermally conductive member to a first recessed portion of the inner surface of the first bottom cover of the first chassis,
  presses, from the first recessed portion, the first thermally conductive member directly against the spine component in the second posture, and
  includes a first protective portion that extends away from the first recessed portion to cover an end surface of the first thermally conductive member; and a second cushion member that
  directly connects the second thermally conductive member to a recessed portion of the inner surface of the second bottom cover of the second chassis,
  presses, from the second recessed portion, the second thermally conductive member directly against the spine component in the second posture, and
  includes a second protective portion that extends away from the second recessed portion to cover an end surface of the second thermally conductive member.

2. The electronic apparatus according to claim 1, wherein the first thermally conductive member and the second thermally conductive member are graphite sheets or metal sheets.

3. The electronic apparatus according to claim 1, wherein the first thermally conductive member and the second thermally conductive member are cushion members made of a thermally conductive material which are pressed against the spine component in the second posture.

4. The electronic apparatus according to claim 1, wherein the first thermally conductive member overlaps the processing device in a thickness direction of the first chassis.

5. The electronic apparatus according to claim 1, wherein the first thermally conductive member and the second thermally conductive member extend along a longitudinal direction of the spine component.

6. The electronic apparatus according to claim 1, further including:
  a display which extends between the first chassis and the second chassis and has a fold region that is bent in response to relative rotations of the first chassis and the second chassis,
  wherein the hinge device has:
  a hinge main body which extends along the first edge portion and the second edge portion, is placed so as to straddle the first edge portion and the second edge portion in the second posture, and supports a rear surface of the display;
  a first support plate which extends along the first edge portion on an inner surface side of the first chassis, is connected with the hinge main body in a relatively rotatable manner, and supports the rear surface of the display; and
  a second support plate which extends along the second edge portion on an inner surface side of the second chassis, is connected to the hinge main body in a relatively rotatable manner, and supports the rear surface of the display, and
  the spine component is a component of the hinge main body.

* * * * *